(12) United States Patent
Wray et al.

(10) Patent No.: US 12,172,666 B2
(45) Date of Patent: Dec. 24, 2024

(54) VEHICLE GUIDANCE WITH SYSTEMIC OPTIMIZATION

(71) Applicant: Nissan North America, Inc., Franklin, TN (US)

(72) Inventors: Kyle Hollins Wray, Mountain View, CA (US); Liam Pedersen, San Francisco, CA (US); Erik Vinkhuyzen, Morgan Hill, CA (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 799 days.

(21) Appl. No.: 17/243,919

(22) Filed: Apr. 29, 2021

(65) Prior Publication Data
US 2022/0371612 A1 Nov. 24, 2022

(51) Int. Cl.
| | |
|---|---|
| *B60W 30/18* | (2012.01) |
| *B60W 50/14* | (2020.01) |
| *B60W 60/00* | (2020.01) |
| *G08G 1/0962* | (2006.01) |
| *G08G 1/0967* | (2006.01) |
| *G08G 1/0968* | (2006.01) |

(52) U.S. Cl.
CPC .... *B60W 60/001* (2020.02); *B60W 30/18163* (2013.01); *B60W 50/14* (2013.01); *B60W 2556/45* (2020.02); *B60W 2720/10* (2013.01)

(58) Field of Classification Search
CPC ......... B60W 60/001; B60W 30/18163; B60W 50/14; B60W 2556/45; B60W 2720/10; G08G 1/09623; G08G 1/096725; G08G 1/096783; G08G 1/096791; G08G 1/096811; G08G 1/096827; G08G 1/096775; Y02T 10/40
USPC .......................................................... 701/25
See application file for complete search history.

(56) References Cited

U.S. PATENT DOCUMENTS

| | | | |
|---|---|---|---|
| 10,671,076 B1 | 6/2020 | Kobilarov et al. | |
| 2017/0316696 A1* | 11/2017 | Bartel | B60K 28/06 |
| 2019/0293443 A1* | 9/2019 | Kelly | G01C 21/3484 |
| 2019/0296443 A1 | 9/2019 | Kirino et al. | |

(Continued)

*Primary Examiner* — Ian Jen
*Assistant Examiner* — Hossam M Abd El Latif
(74) *Attorney, Agent, or Firm* — Young Basile Hanlon & MacFarlane, P.C.

(57) ABSTRACT

Vehicle guidance with systemic optimization may include traversing, by a current vehicle, a vehicle transportation network, by obtaining, by the current vehicle, systemic-utility vehicle guidance data for a current portion of the vehicle transportation network and traversing, by the current vehicle, the current portion of the vehicle transportation network in accordance with the systemic-utility vehicle guidance data. Obtaining the systemic-utility vehicle guidance data may include obtaining vehicle operational data for a region of a vehicle transportation network, wherein the vehicle operational data includes current operational data for a plurality of vehicles operating in the region, operating a systemic-utility vehicle guidance model for the region, obtaining systemic-utility vehicle guidance data for the region from the systemic-utility vehicle guidance model in response to the vehicle operational data, and outputting the systemic-utility vehicle guidance data to the current vehicle.

20 Claims, 5 Drawing Sheets

(56) References Cited

U.S. PATENT DOCUMENTS

| | | | |
|---|---|---|---|
| 2020/0005645 A1* | 1/2020 | Wray | B60W 30/18159 |
| 2020/0159213 A1* | 5/2020 | Svegliato | B60W 50/029 |
| 2022/0244061 A1* | 8/2022 | Mellinger | B60W 30/1882 |
| 2022/0250641 A1* | 8/2022 | Seegmiller | G01C 21/3407 |
| 2022/0300267 A1* | 9/2022 | Ucar | G06F 8/71 |
| 2023/0230475 A1* | 7/2023 | Gun | G08G 1/20 |
| | | | 701/117 |

* cited by examiner

VEHICLE GUIDANCE WITH SYSTEMIC OPTIMIZATION

TECHNICAL FIELD

This disclosure relates to vehicle operation, including methods, apparatuses, and non-transitory computer readable media for performing vehicle guidance with systemic optimization.

BACKGROUND

Vehicle, such as manually controlled vehicles, semi-autonomously controlled vehicles, or autonomous vehicles, operating in a vehicle transportation network may traverse the vehicle transportation network, or a portion thereof, by performing a sequence of discrete vehicle control operations identified based on maximizing predicted operational utility for the respective vehicle.

SUMMARY

Disclosed herein are aspects, features, elements, implementations, and embodiments of vehicle guidance with systemic optimization.

An aspect of the disclosed embodiments is a method for use in traversing a vehicle transportation network by a vehicle using vehicle guidance with systemic optimization. The method includes obtaining, by the vehicle, systemic-utility vehicle guidance data for a current portion of the vehicle transportation network, and traversing, by the vehicle, the current portion of the vehicle transportation network in accordance with the systemic-utility vehicle guidance data.

Another aspect of the disclosed embodiments is a method of vehicle guidance with systemic optimization. The method includes obtaining vehicle operational data for a region of a vehicle transportation network, wherein the vehicle operational data includes current operational data for a plurality of vehicles operating in the region, operating a systemic-utility vehicle guidance model for the region, obtaining systemic-utility vehicle guidance data for the region from the systemic-utility vehicle guidance model in response to the vehicle operational data, and outputting the systemic-utility vehicle guidance data.

Another aspect of the disclosed embodiments is a method of vehicle guidance with systemic optimization. The method includes obtaining, by the vehicle, systemic-utility vehicle guidance data for a current portion of the vehicle transportation network, and traversing, by the vehicle, the current portion of the vehicle transportation network in accordance with the systemic-utility vehicle guidance data. Obtaining the systemic-utility vehicle guidance data includes obtaining vehicle operational data for a region of a vehicle transportation network, wherein the vehicle operational data includes current operational data for a plurality of vehicles operating in the region, operating a systemic-utility vehicle guidance model for the region, obtaining systemic-utility vehicle guidance data for the region from the systemic-utility vehicle guidance model in response to the vehicle operational data, and outputting the systemic-utility vehicle guidance data.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
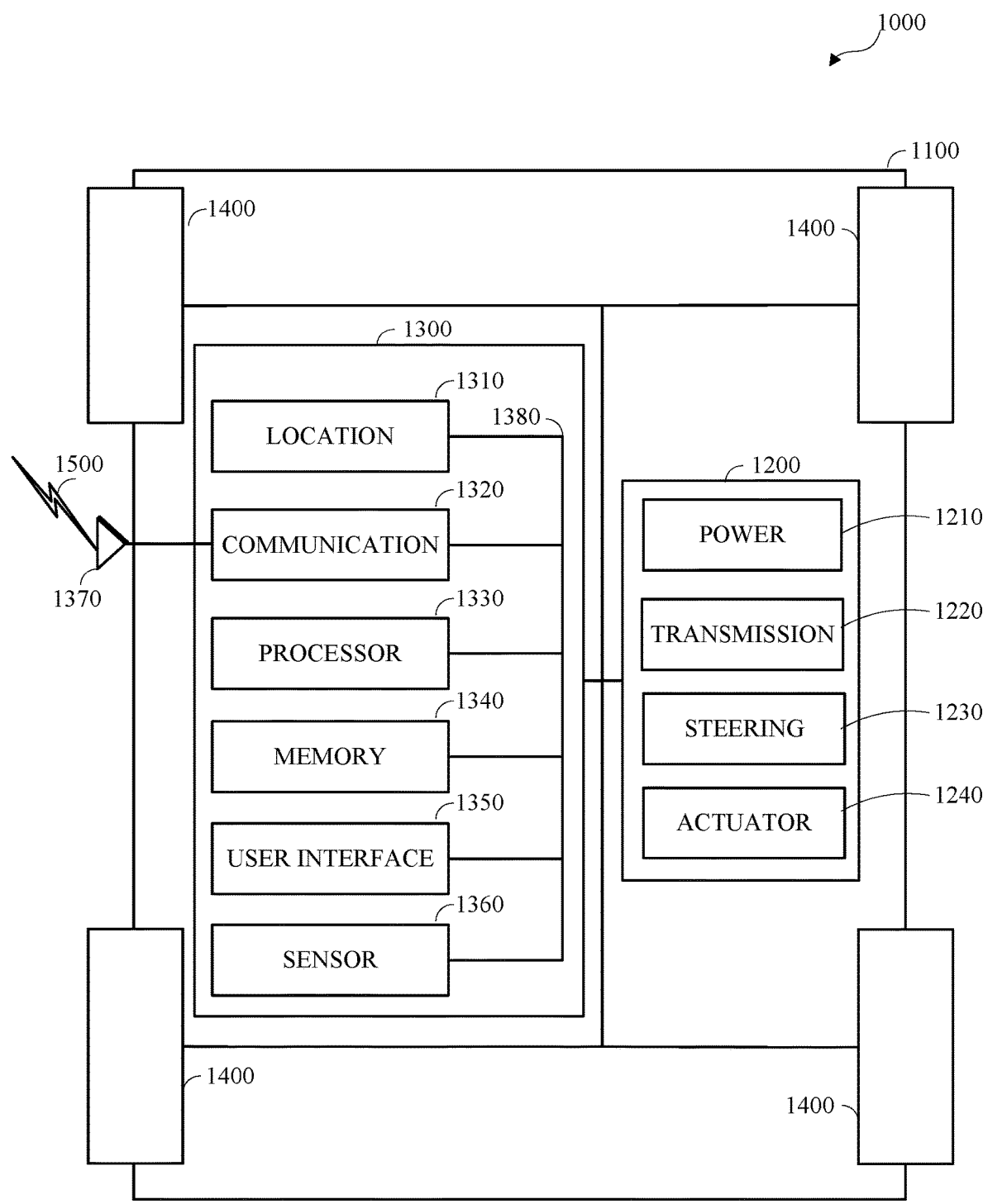
FIG. 1 is a diagram of an example of a vehicle in which the aspects, features, and elements disclosed herein may be implemented.

A vehicle, such as a manually controlled vehicle, a semi-autonomously controlled vehicle, or an autonomous vehicle, operating in a vehicle transportation network may traverse the vehicle transportation network, or a portion thereof, by performing a sequence of discrete vehicle control operations, such as a vehicle control action or a routing determination. Respective discrete vehicle control operations have operational costs, such risk (or, inversely, safety) and travel time. The operational costs may be interrelated. For example, the vehicle control operation of increasing speed may reduce the operational cost associated with travel time and may increase the operational costs associated with risk.

A weighted sum of operational costs associated with a vehicle control operation may be identified as the operational utility for the vehicle control operation. Maximizing operational utility balances the minimization of respective operational costs, such as risk (or, inversely, safety) and travel time. Although operational utility is described herein with respect to risk and travel time, other operational costs, such as fuel utilization, may be used. The operational utility of a vehicle control operation with respect to the vehicle performing the vehicle control operation may be identified as the vehicle-specific operational utility.

A vehicle operating in a vehicle transportation network is controlled responsive to current operational parameters of the vehicle and the current operational environment of the vehicle, such as within a defined distance of the vehicle, to maximize vehicle-specific operational utility. The information used to identify vehicle-specific operational utility may omit, or incorrectly weight, some information that may affect the operation of the vehicle. For example, for some vehicles some information, such as information regarding the operational environment of the region other than the current operational environment of the vehicle, that may affect the operation of the vehicle may be unavailable to the vehicle, or to the operator, manual or autonomous, of the vehicle, or may be available and may be unutilized or improperly weighted. In another example, response delay, indicating the temporal delay from an event, or occurrence, in the region that may affect the operation of the vehicle to the detection of the event, or data representing the event, and on through the identification of a vehicle control operation responsive to the event and the performance of that vehicle control operation may limit the operational utility of the vehicle control operation. Differences between predicted operational utility and observed operational utility may correspond with the differences in the operative information utilized and the relative weighting thereof.

For some vehicles, the maximization of vehicle-specific operational utility may correlate with sub-optimal systemic utility. Systemic utility balances, or aggregates, the operational utility for vehicles operating in a defined region of the vehicle transportation network. The maximization of systemic utility may include using information unavailable for, unused by, or improperly weighted in, the maximization of vehicle-specific operational utility. Sub-optimal systemic utility may correspond to the differences between predicted vehicle-specific operational utility and observed vehicle-specific operational utility.

Vehicle guidance with systemic optimization includes obtaining vehicle operational and environmental data for vehicles in a defined region of a vehicle transportation network. The vehicle operational and environmental data may include some data unavailable for, unused by, or improperly weighted in, the maximization of vehicle-specific operational utility as performed on a per-vehicle basis for respective vehicles in the region. Vehicle guidance with systemic optimization includes operating a systemic-utility vehicle guidance model that maximizes systemic utility for the region. Vehicle guidance with systemic optimization includes obtaining per-vehicle systemic-utility vehicle guidance data from the systemic-utility vehicle guidance model for the region responsive to the vehicle operational and environmental data for the region. Vehicle guidance with systemic optimization includes providing the systemic-utility vehicle guidance data to respective participating vehicles operating in the region.

A region that includes participating vehicles operating in the region that obtain the systemic-utility vehicle guidance data and traverse at least a portion of the vehicle transportation network in the region in accordance with the systemic-utility vehicle guidance data have an improvement in the observed systemic utility of the region relative to regions that omit participating vehicles. Because the operations of a vehicle, such as a participating vehicle, affect the operations of other vehicles, such as vehicles in the operational environment of the participating vehicle, which may be non-participating vehicles, a relatively small proportion, such as one percent, of participating vehicles to non-participating vehicles may effectively maximize the systemic-utility of the region, which may improve the observed vehicle-specific operational utility of the vehicles, including the participating vehicles and the non-participating vehicles. In some embodiments, the improvement in systemic-utility of the region may be correlated to the proportion of participating vehicles.

FIG. 1 is a diagram of an example of a vehicle in which the aspects, features, and elements disclosed herein may be implemented. As shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include controlling a kinetic state of the vehicle, such as by accelerating or decelerating, controlling a directional state of the vehicle, such as by steering, or otherwise controlling the vehicle 1000.

As shown, the powertrain 1200 includes a power source 1210, a transmission 1220, a steering unit 1230, and an actuator 1240. Other elements or combinations of elements of a powertrain, such as a suspension, a drive shaft, axles, or an exhaust system may be included. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

As shown, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 may include a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle 1000. The sensor 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 1000.

The sensor 1360 may include one or more sensors operable to obtain information regarding the physical environment surrounding the vehicle 1000. For example, one or more sensors may detect road geometry and features, such as lane lines, and obstacles, such as fixed obstacles, vehicles, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be a combined unit.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements, not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 1300 may include the autonomous vehicle control unit.

The autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network data representing the vehicle transportation network, or a combination thereof, and may control or operate the vehicle 1000 to traverse the vehicle transportation network in accordance with the route. For example, the autonomous vehicle control unit may output the route of travel to the trajectory controller, and the trajectory controller may operate the vehicle 1000 to travel from the origin to the destination using the generated route.

Figure 2:
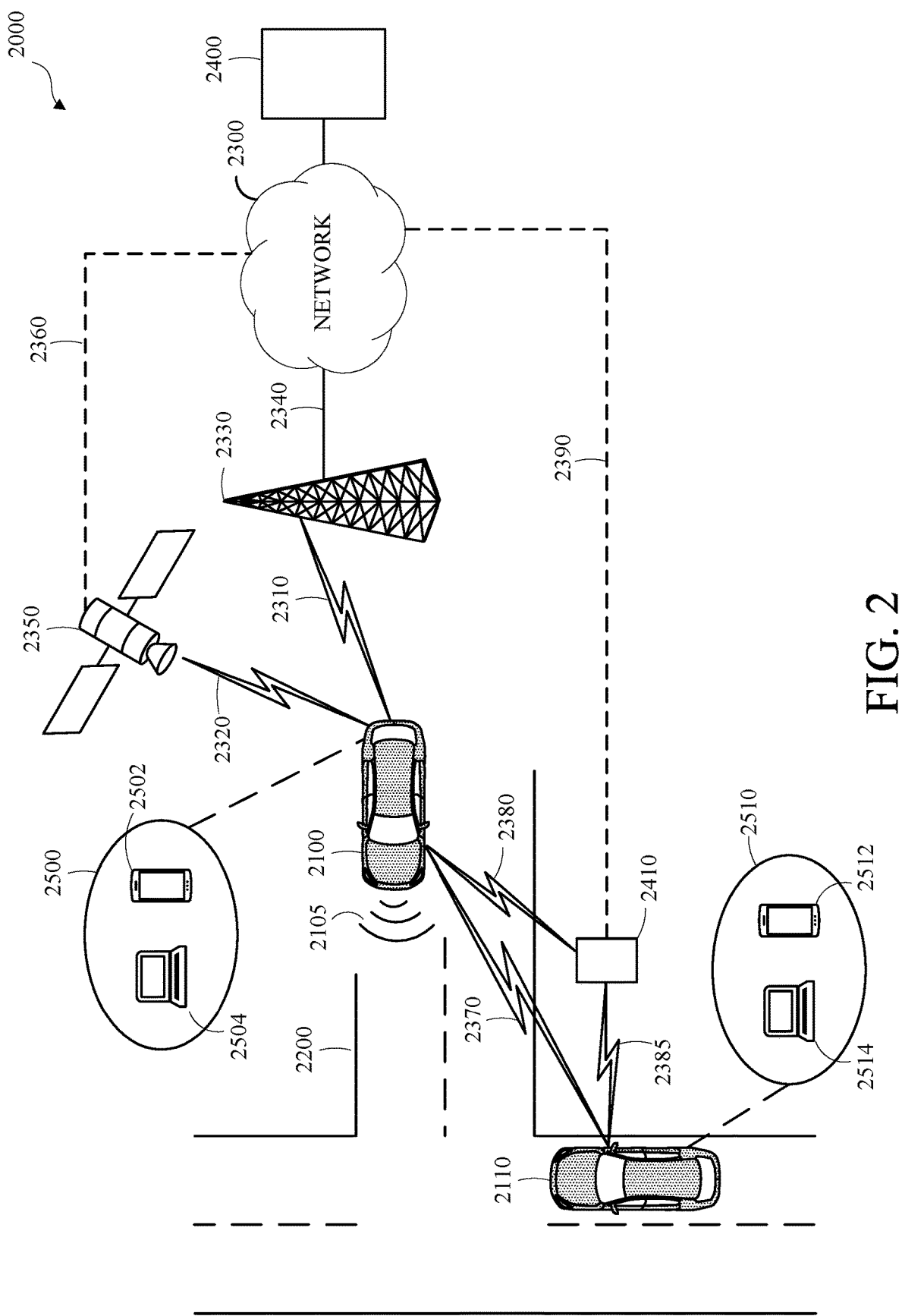
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200 and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400/2410. For example, a vehicle 2100/2110 may receive information, such as information representing the vehicle transportation network 2200, from a communication device 2400 via the network 2300. In another example, a vehicle 2100/2110 may receive information, such as information representing the vehicle transportation network 2200, from a communication device 2410 via direct wireless communication.

In some embodiments, a vehicle 2100/2110 may communicate via a wired communication link (not shown), a wireless communication link 2310/2320/2370/2380/2385, or a combination of any number of wired or wireless communication links. For example, as shown, a vehicle 2100/2110 may communicate via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with an infrastructure device. For example, the communication devices 2400/2410 shown in FIG. 2 may be infrastructure devices. An infrastructure device may be associated with a defined region of the vehicle transportation network, such as a lane, a road segment, a contiguous group of road segments, a road, or an intersection, or a defined geographic region, such as a block, a neighborhood, a district, a county, a municipality, a state, a country, or another defined geographic region. An infrastructure device may be a centralized infrastructure device or a decentralized infrastructure device. For example, the communication device 2400 may be a centralized infrastructure device and the communication device 2410 may be a decentralized infrastructure device. A vehicle 2100/2110 may communicate with a communication device 2410 via a direct communication link 2380/2385 or via the network 2300. The direct communication link 2380/2385 may be a wireless communication link.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via the network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds. The direct communication link 2370 may be, for example, a wireless communication link.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, may be configured to communicate with a vehicle 2100, with a communication network 2300, with one or more communication devices 2400/2410, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 2100 may communicate with the communications network 2300 via a satellite 2350, or other non-terrestrial communication device. The satellite 2350, which may include a computing device, may be configured to communicate with a vehicle 2100, with a communication network 2300, with one or more communication devices 2400/2410, or with a combination thereof via one or more communication links 2320/2360. Although shown as a single unit in FIG. 2, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements. The communication devices 2400/2410 may communicate, such as via a communication link 2390.

The vehicle 2100 may identify a portion or condition of the vehicle transportation network 2200. For example, the vehicle 2100 may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows two vehicles 2100, 2110, one vehicle transportation network 2200, one electronic communication network 2300, and two communication devices 2400/2410, any number of vehicles, networks, or computing devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400/2410 via a direct communication link, such as a Bluetooth communication link.

In some embodiments, a vehicle 2100/2210 may be associated with an entity 2500/2510, such as a driver, operator, or owner of the vehicle. In some embodiments, an entity 2500/2510 associated with a vehicle 2100/2110 may be associated with one or more personal electronic devices 2502/2504/2512/2514, such as a smartphone 2502/2512 or a computer 2504/2514. In some embodiments, a personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
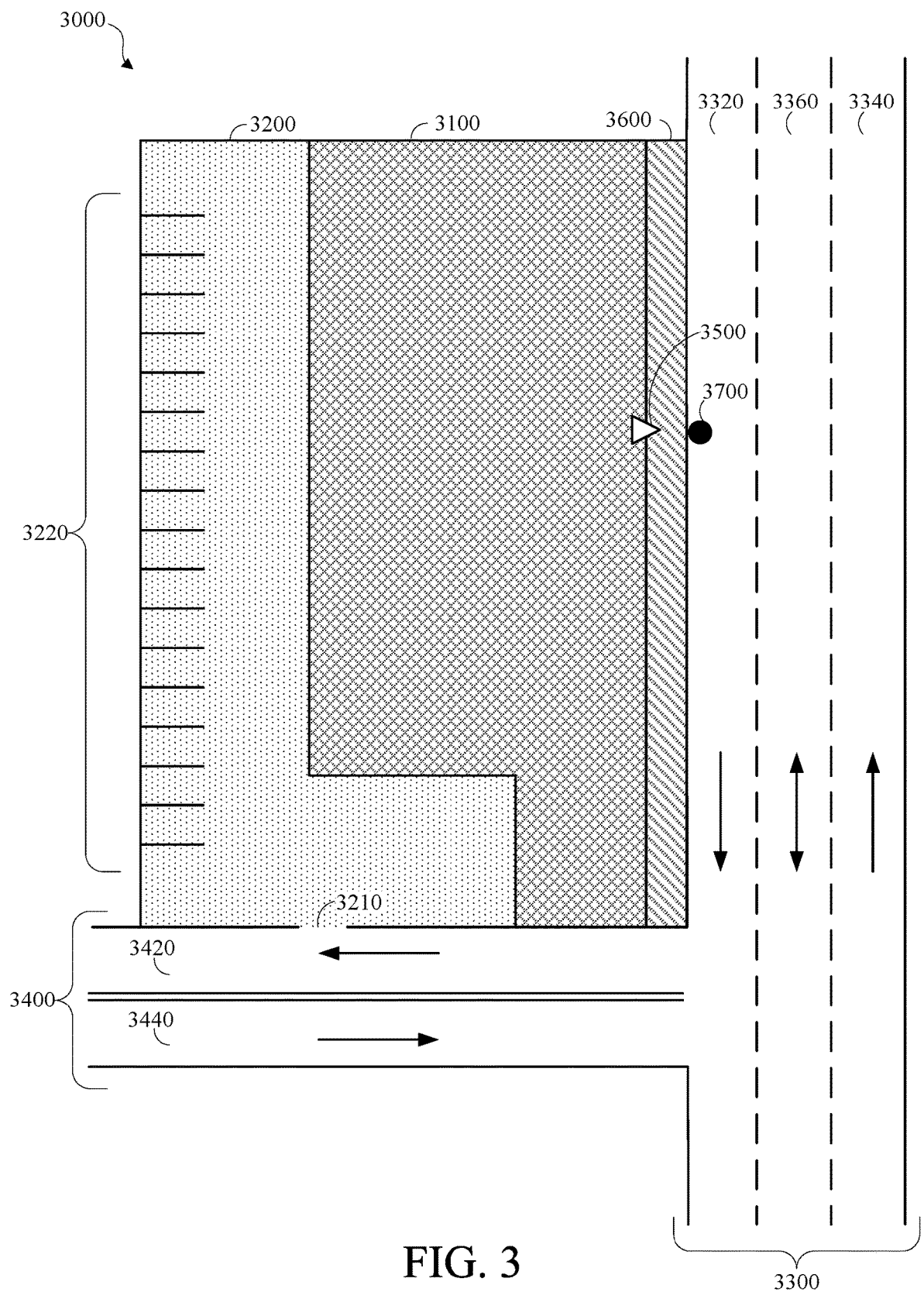
FIG. 3 is a diagram of a portion of a vehicle transportation network.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400. The parking area 3200 may include parking slots 3220.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian crosswalk, may correspond with a navigable area, or a partially navigable area, of a vehicle transportation network.

A portion, or a combination of portions, of the vehicle transportation network may be identified as a point of interest or a destination. For example, the vehicle transportation network data may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

A destination may be associated with one or more entrances, such as the entrance 3500 shown in FIG. 3. The vehicle transportation network data may include defined entrance location information, such as information identifying a geolocation of an entrance associated with a destination.

A destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

The vehicle transportation network data may include docking location information, such as information identifying a geolocation of one or more docking locations 3700 associated with a destination. Although not shown separately in FIG. 3, the docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

Figure 4:
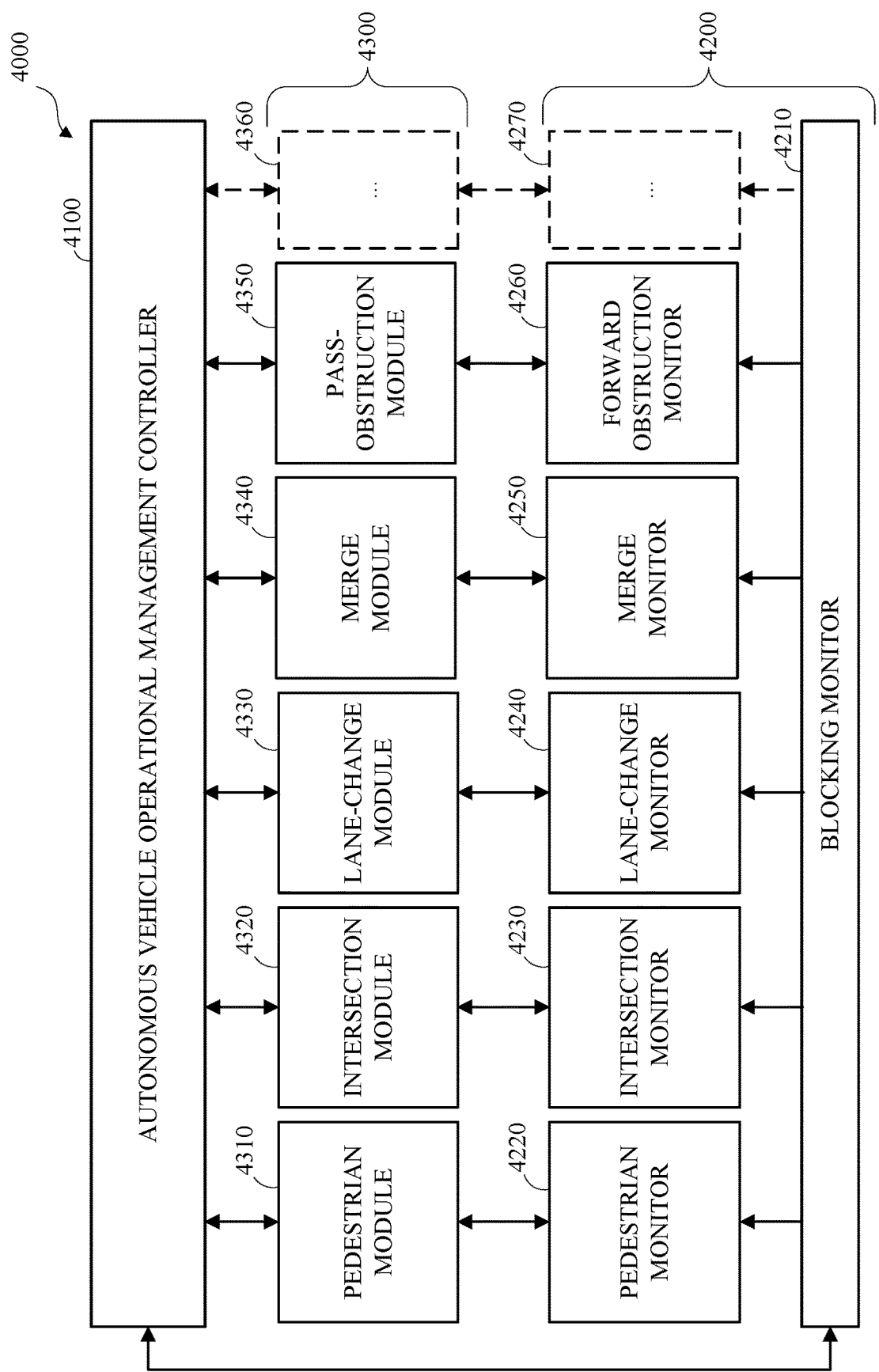
FIG. 4 is a diagram of an example of an autonomous vehicle operational management system.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

As shown in FIG. 4, the autonomous vehicle operational management system 4000 includes an autonomous vehicle operational management controller 4100 (AVOMC), operational environment monitors 4200, and scenario-specific operation control evaluation modules 4300.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

The AVOMC 4100, or another unit of the autonomous vehicle, may control the autonomous vehicle to traverse the vehicle transportation network, or a portion thereof. Controlling the autonomous vehicle to traverse the vehicle transportation network may include monitoring the operational environment of the autonomous vehicle, identifying or detecting distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

The AVOMC 4100 may receive, identify, or otherwise access, operational environment data representing an operational environment for the autonomous vehicle, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle. The operative conditions that may affect the operation of the autonomous vehicle may include roads, road segments, or lanes that the autonomous vehicle may traverse; traffic control devices that may affect the operation of the autonomous vehicle; identifiable rules, regulations, or laws that may affect the operation of the autonomous vehicle; identifiable external objects that may affect the operation of the autonomous vehicle; the operational state of the autonomous vehicle; the operational state of one or more passengers of autonomous vehicle; the operational state of cargo of the autonomous vehicle; or any other identifiable condition, state, or event that may affect the operation of the autonomous vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle.

The operational environment data may include information representing the vehicle transportation network proximate to an identified route for the autonomous vehicle, such as within a defined spatial distance, such as 300 meters, of portions of the vehicle transportation network along the identified route, which may include information indicating the geometry of one or more aspects of the vehicle transportation network, information indicating a condition, such as a surface condition, of the vehicle transportation network, or any combination thereof.

The operational environment data may include information representing the vehicle transportation network proximate to the autonomous vehicle, such as within a defined spatial distance of the autonomous vehicle, such as 300 meters, which may include information indicating the geometry of one or more aspects of the vehicle transportation network, information indicating a condition, such as a surface condition, of the vehicle transportation network, or any combination thereof.

The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenarios may be used.

The autonomous vehicle may concurrently traverse multiple distinct vehicle operational scenarios within an operational environment. The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 4100 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 4100 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitoring the operational environment of the autonomous vehicle may include using operational environment data received from the operational environment monitors 4200. The AVOMC 4100 may monitor, update, or both, the operational environment data.

The operational environment monitors 4200 may include scenario-agnostic monitors, scenario-specific monitors, or a combination thereof.

The scenario-agnostic monitors, such as a blocking monitor 4210, may monitor the operational environment of the autonomous vehicle, generate operational environment data representing aspects of the operational environment of the autonomous vehicle, and output the operational environment data to one or more scenario-specific monitors, the AVOMC 4100, or a combination thereof.

A scenario-specific monitor, such as a pedestrian monitor 4220, an intersection monitor 4230, a lane-change monitor 4240, a merge monitor 4250, or a forward obstruction monitor 4260, may monitor the operational environment of the autonomous vehicle, generate operational environment data representing scenario-specific aspects of the operational environment of the autonomous vehicle, and output the operational environment data to one or more scenario-specific operation control evaluation modules 4300, the AVOMC 4100, or a combination thereof. For example, the pedestrian monitor 4220 may be an operational environment monitor for monitoring pedestrians, the intersection monitor 4230 may be an operational environment monitor for monitoring intersections, the lane-change monitor 4240 may be an operational environment monitor for monitoring lane-changes, the merge monitor 4250 may be an operational environment monitor for merges, and the forward obstruction monitor 4260 may be an operational environment monitor for monitoring forward obstructions. An operational environment monitor 4270 is shown using broken lines to indicate that the autonomous vehicle operational management system 4000 may include any number of operational environment monitors 4200.

An operational environment monitor 4200 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 4220 may receive, or otherwise access, information, such as sensor data, which may indicate, correspond to, or may otherwise be associated with, one or more pedestrians in the operational environment of the autonomous vehicle. An operational environment monitor 4200 may associate the operational environment data, or a portion thereof, with the operational environment, or an aspect thereof, such as with an external object, such as a pedestrian, a remote vehicle, or an aspect of the vehicle transportation network geometry.

An operational environment monitor 4200 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 4200 may output the information representing the one or more aspects of the operational environment to, or for access by, the AVOMC 4100, such by storing the information representing the one or more aspects of the operational environment in a memory, such as the memory 1340 shown in FIG. 1, of the autonomous vehicle accessible by the AVOMC 4100, sending the information representing the one or more aspects of the operational environment to the AVOMC 4100, or a combination thereof. An operational environment monitor 4200 may output the operational environment data to one or more elements of the autonomous vehicle operational management system 4000, such as the AVOMC 4100. Although not shown in FIG. 4, a scenario-specific operational environment monitor 4220, 4230, 4240, 4250, 4260 may output operational environment data to a scenario-agnostic operational environment monitor, such as the blocking monitor 4210.

The pedestrian monitor 4220 may correlate, associate, or otherwise process the operational environment data to identify, track, or predict actions of one or more pedestrians. For example, the pedestrian monitor 4220 may receive information, such as sensor data, from one or more sensors, which may correspond to one or more pedestrians, the pedestrian monitor 4220 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 4220 may output the identified, associated, or generated pedestrian information to, or for access by, the AVOMC 4100.

The intersection monitor 4230 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 4230 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 4230 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and intersection monitor 4230 may output the identified, associated, or generated intersection information to, or for access by, the AVOMC 4100.

The lane-change monitor 4240 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 4240 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 4240 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles, and the lane-change monitor 4240 may output the identified, associated, or generated lane-change information to, or for access by, the AVOMC 4100.

The merge monitor 4250 may correlate, associate, or otherwise process the operational environment data to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 4250 may associate the sensor data with one or more identified remote vehicles in the operational environment of the autonomous vehicle, one or more aspects of the operational environment of the autonomous vehicle or a combination thereof geospatially corresponding to a merge operation, which may include may identifying a current or expected direction of travel, a path, such as an expected path, a current or expected velocity, a current or expected acceleration rate, or a combination thereof for one or more of the respective identified remote vehicles, and the merge monitor 4250 may output the identified, associated, or generated merge information to, or for access by, the AVOMC 4100.

The forward obstruction monitor 4260 may correlate, associate, or otherwise process the operational environment data to identify one or more aspects of the operational environment of the autonomous vehicle geospatially corresponding to a forward pass-obstruction operation. For example, the forward obstruction monitor 4260 may identify vehicle transportation network geometry in the operational environment of the autonomous vehicle; the forward obstruction monitor 4260 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 4260 may identify, track, or predict actions of one or more remote vehicles in the operational environment of the autonomous vehicle. The forward obstruction monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation, the forward obstruction monitor 4250 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles, and the forward obstruction monitor 4250 may output the identified, associated, or generated forward obstruction information to, or for access by, the AVOMC 4100.

The blocking monitor 4210 may receive operational environment data representing an operational environment, or an aspect thereof, for the autonomous vehicle. The blocking monitor 4210 may determine a respective probability of availability, or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. The blocking monitor 4210 may determine, or update, probabilities of availability continually or periodically. The blocking monitor 4210 may communicate probabilities of availability, or corresponding blocking probabilities, to the AVOMC 4100.

The AVOMC 4100 may identify one or more distinct vehicle operational scenarios based on one or more aspects of the operational environment represented by the operational environment data. For example, the AVOMC 4100 may identify a distinct vehicle operational scenario in response to identifying, or based on, the operational environment data indicated by one or more of the operational environment monitors 4200. The distinct vehicle operational scenario may be identified based on route data, sensor data, or a combination thereof. For example, the AVOMC 4100 may identifying one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 4100 may identify a pedestrian vehicle operational scenario, an intersection vehicle operational scenario, or both.

The AVOMC 4100 may instantiate respective instances of one or more of the scenario-specific operation control evaluation modules 4300 based on one or more aspects of the operational environment represented by the operational environment data. The scenario-specific operation control evaluation modules 4300 may include scenario-specific operation control evaluation modules (SSOCEMs), such as a pedestrian-SSOCEM 4310, an intersection-SSOCEM 4320, a lane-change-SSOCEM 4330, a merge-SSOCEM 4340, a pass-obstruction-SSOCEM 4350, or a combination thereof. A SSOCEM 4360 is shown using broken lines to indicate that the autonomous vehicle operational management system 4000 may include any number of SSOCEMs 4300. For example, the AVOMC 4100 may instantiate an instance of a SSOCEM 4300 in response to identifying a distinct vehicle operational scenario. The AVOMC 4100 may instantiate multiple instances of one or more SSOCEMs 4300 based on one or more aspects of the operational environment represented by the operational environment data. For example, the operational environment data may indicate two pedestrians in the operational environment of the autonomous vehicle and the AVOMC 4100 may instantiate a respective instance of the pedestrian-SSOCEM 4310 for each pedestrian based on one or more aspects of the operational environment represented by the operational environment data.

The AVOMC 4100 may transmit, send, or otherwise make available, such as by storing in a shared memory, the operational environment data, or one or more aspects thereof, to another unit of the autonomous vehicle, such as the blocking monitor 4210 or one or more instances of the SSOCEMs 4300. For example, the AVOMC 4100 may communicate the probabilities of availability, or corresponding blocking probabilities, received from the blocking monitor 4210 to respective instantiated instances of the SSOCEMs 4300. The AVOMC 4100 may store the operational environment data, or one or more aspects thereof, such as in a memory, such as the memory 1340 shown in FIG. 1, of the autonomous vehicle.

Controlling the autonomous vehicle to traverse the vehicle transportation network may include identifying candidate vehicle control actions based on the distinct vehicle operational scenarios, controlling the autonomous vehicle to traverse a portion of the vehicle transportation network in accordance with one or more of the candidate vehicle control actions, or a combination thereof. For example, the AVOMC 4100 may receive one or more candidate vehicle control actions from respective instances of the SSOCEMs 4300. The AVOMC 4100 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as controlling a kinetic state of the vehicle, such as by accelerating, decelerating, or stopping the vehicle, controlling a directional state of the vehicle, such as by steering or turning stopping the vehicle, or any other vehicle operation or combination of vehicle operations that may be performed by the autonomous vehicle in conjunction with traversing a portion of the vehicle transportation network.

For example, a 'stop' vehicle control action may include controlling the vehicle to traverse the vehicle transportation network, or a portion thereof, by controlling a kinetic control unit, a trajectory control unit, or a combination of control units, to stop the vehicle or otherwise control the vehicle to become or remain stationary; a 'Yield' vehicle control action may include controlling the vehicle to traverse the vehicle transportation network, or a portion thereof, by controlling a kinetic control unit, a trajectory control unit, or a combination of control units, to slow the vehicle or otherwise control the vehicle to move at a speed within a defined threshold or range, which may be lower than or within a defined statutory speed limit; an 'orientation-adjust' vehicle control action may include controlling the vehicle to traverse the vehicle transportation network, or a portion thereof, by controlling a kinetic control unit, a trajectory control unit, or a combination of control units, to alter the orientation of the vehicle relative occlusions, external objects, or both, within defined right-of-way parameters; an 'accelerate' vehicle control action may include controlling the vehicle to traverse the vehicle transportation network, or a portion thereof, by controlling a kinetic control unit, a trajectory control unit, or a combination of control units, to accelerate at a defined acceleration rate, or at an acceleration rate within a defined range; a 'decelerate' vehicle control action may include controlling the vehicle to traverse the vehicle transportation network, or a portion thereof, by controlling a kinetic control unit, a trajectory control unit, or a combination of control units, to decelerate a defined deceleration rate, or at a deceleration rate within a defined range; a 'maintain' vehicle control action may include controlling the vehicle to traverse the vehicle transportation network, or a portion thereof, by controlling a kinetic control unit, a trajectory control unit, or a combination of control units, to maintain current operational parameters, such as by maintaining a current velocity, a current path or route, or a current lane orientation; and a 'proceed' vehicle control action may include controlling the vehicle to traverse the vehicle transportation network, or a portion thereof, by controlling a kinetic control unit, a trajectory control unit, or a combination of control units, to begin or resume a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained. A vehicle control action may be a compound vehicle control action, which may include a sequence, combination, or both of vehicle control actions. For example, an 'orientation-adjust' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'orientation-adjust' vehicle control action includes controlling the autonomous vehicle to slowly inch forward a short distance, such as a few inches or a foot.

The AVOMC 4100 may uninstantiate an instance of a SSOCEM 4300. For example, the AVOMC 4100 may identify a distinct set of operative conditions as indicating a distinct vehicle operational scenario for the autonomous vehicle, instantiate an instance of a SSOCEM 4300 for the distinct vehicle operational scenario, monitor the operative conditions, subsequently determine that one or more of the operative conditions has expired, or has a probability of affecting the operation of the autonomous vehicle below a defined threshold, and the AVOMC 4100 may uninstantiate the instance of the SSOCEM 4300.

The AVOMC 4100 may instantiate and uninstantiate instances of SSOCEMs 4300 based on one or more vehicle operational management control metrics, such as an immanency metric, an urgency metric, a utility metric, an acceptability metric, or a combination thereof. An immanency metric may indicate, represent, or be based on, a spatial, temporal, or spatiotemporal distance or proximity, which may be an expected distance or proximity, for the vehicle to traverse the vehicle transportation network from a current location of the vehicle to a portion of the vehicle transportation network corresponding to a respective identified vehicle operational scenario. An urgency metric may indicate, represent, or be based on, a measure of the spatial, temporal, or spatiotemporal distance available for controlling the vehicle to traverse a portion of the vehicle transportation network corresponding to a respective identified vehicle operational scenario. A utility metric may indicate, represent, or be based on, an expected value of instantiating an instance of a SSOCEM 4300 corresponding to a respective identified vehicle operational scenario. An acceptability metric may be a safety metric, such a metric indicating collision avoidance, a vehicle transportation network control compliance metric, such as a metric indicating compliance with vehicle transportation network rules and regulations, a physical capability metric, such as a metric indicating a maximum braking capability of the vehicle, a user defined metric, such as a user preference. Other metrics, or combinations of metrics may be used. A vehicle operational management control metric may indicate a defined rate, range, or limit. For example, an acceptability metric may indicate a defined target rate of deceleration, a defined range of deceleration rates, or a defined maximum rate of deceleration.

A SSOCEM 4300 may include one or more models of a respective distinct vehicle operational scenario. The autonomous vehicle operational management system 4000 may include any number of SSOCEMs 4300, each including models of a respective distinct vehicle operational scenario. A SSOCEM 4300 may include one or more models from one or more types of models. For example, a SSOCEM 4300 may include a Partially Observable Markov Decision Process (POMDP) model, a Markov Decision Process (MDP) model, a Classical Planning model, a Partially Observable Stochastic Game (POSG) model, a Decentralized Partially Observable Markov Decision Process (Dec-POMDP) model, a Reinforcement Learning (RL) model, an artificial neural network model, or any other model of a respective distinct vehicle operational scenario. Each different type of model may have respective characteristics for accuracy and resource utilization. For example, a POMDP model for a defined scenario may have greater accuracy and greater resource utilization than an MDP model for the defined scenario. The models included in a SSOCEM 4300 may be ordered, such as hierarchically, such as based on accuracy. For example, a designated model, such as the most accurate model included in an SSOCEM 4300, may be identified as the primary model for the SSOCEM 4300 and other models included in the SSOCEM 4300 may be identified as secondary models.

In an example, one or more of the SSOCEMs 4300 may include a POMDP model, which may be a single-agent model, and which may be a decision-making framework for reasoning in partially observable stochastic environments. A POMDP model may model a distinct vehicle operational scenario, which may include modeling uncertainty, using a set of states within the domain of the model, a set of actions (A), a set of observations ($\Omega$), a set of state transition probabilities (T), a set of conditional observation probabilities (O), a reward function (R), or a combination thereof. A POMDP model may be defined or described as a tuple<S, A, $\Omega$, T; O, R>.

A state (s) from the set of states (S), may represent a distinct condition of respective defined aspects, such as external objects and traffic control devices, of the operational environment of the autonomous vehicle that may probabilistically affect the operation of the autonomous vehicle at a discrete temporal location within the domain of the model. A respective set of states (S) may be defined for each distinct vehicle operational scenario. Each state (state space), from a set of states (S) may include one or more defined state factors. Although some examples of state factors for some models are described herein, a model, including any model described herein, may include any number, or cardinality, of state factors. Each state factor may represent a defined aspect of the respective scenario and may have a respective defined set of values. Although some examples of state factor values for some state factors are described herein, a state factor, including any state factor described herein, may include any number, or cardinality, of values.

An action (a) from the set of actions (A) may indicate an available vehicle control action at each state in the set of states (S). A respective set of actions may be defined for each distinct vehicle operational scenario. Each action (action space), from a set of actions (A) may include one or more defined action factors. Although some examples of action factors for some models are described herein, a model, including any model described herein, may include any number, or cardinality, of action factors. Each action factor may represent an available vehicle control action and may have a respective defined set of values. Although some examples of action factor values for some action factors are described herein, an action factor, including any action factor described herein, may include any number, or cardinality, of values.

An observation ($\omega$) from the set of observations ($\Omega$) may indicate available observable, measurable, or determinable data for each state from the set of states (S). A respective set of observations may be defined for each distinct vehicle operational scenario. Each observation (observation space), from a set of observations ($\Omega$) may include one or more defined observation factors. Although some examples of observation factors for some models are described herein, a model, including any model described herein, may include any number, or cardinality, of observation factors. Each observations factor may represent available observations and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as T: S×A×S→[0, 1], which may represent a mapping of each state s from the set of states S (s∈S) and action a from the set of actions A (a∈A) to a respective probability of transitioning to a subsequent state s' from the set of states (s'∈S). A respective set of state transition probabilities (T) may be defined for each distinct vehicle operational scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

A conditional observation probability from the set of conditional observation probabilities (O) may represent probabilities of making respective observations ($\Omega$) based on the operational environment of the autonomous vehicle, as represented by the set of states (S), responsive to the actions of the autonomous vehicle, as represented by the set of actions (A), which may be represented as O: A×S×$\Omega$→[0, 1], which may represent an observation function mapping each state s from the set of states S (s∈S) and action a from the set of actions A (a∈A) to a respective probability of observing an observation $\omega$ ($\omega$∈$\Omega$). A respective set of conditional observation probabilities (O) may be defined for each distinct vehicle operational scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: S×A→□, which may represent a mapping of each state s from the set of states S (s∈S) and action a from the set of actions A (a∈A) to an expected immediate reward at the respective subsequent state s' from the set of states (s'∈S).

For simplicity and clarity, the examples of values of a model, such as state factor values or observation factor values, described herein include categorical representations, such as {start, goal} or {short, long}. The categorical values may represent defined discrete values, which may be relative values. For example, a state factor representing a temporal aspect may have values from the set {short, long}; the value 'short' may represent discrete values, such as a temporal distance, within, or less than, a defined threshold, such as three seconds, and the value 'long' may represent discrete values, such as a temporal distance, of at least, such as equal to or greater than, the defined threshold. Defined thresholds for respective categorical values may be defined relative to associated factors. For example, a defined threshold for the set {short, long} for a temporal factor may be associated with a relative spatial location factor value and another defined threshold for the set {short, long} for the temporal factor may be associated with another relative spatial location factor value. Although categorical representations of factor values are described herein, other representations, or combinations of representations, may be used. For example, a set of temporal state factor values may be {short (representing values of less than three seconds), 4, 5, 6, long (representing values of at least 7 seconds)}.

In some embodiments, such as embodiments implementing a POMDP model, modeling an autonomous vehicle operational control scenario may include modeling occlusions. For example, the operational environment data may include information corresponding to one or more occlusions, such as sensor occlusions, in the operational environment of the autonomous vehicle such that the operational environment data may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. In some embodiments, an operational environment monitor 4200 may identify occlusions, may identify or determine a probability that an external object is occluded, or hidden, by an identified occlusion, and may include occluded vehicle probability information in the operational environment data output to the AVOMC 4100, and communicated, by the AVOMC 4100, to the respective SSOCEMs 4300.

The autonomous vehicle operational management system 4000 may include any number or combination of types of models. For example, the pedestrian-SSOCEM 4310, the intersection-SSOCEM 4320, the lane-change-SSOCEM 4330, the merge-SSOCEM 4340, and the pass-obstruction-SSOCEM 4350 may be POMDP models. In another example, the pedestrian-SSOCEM 4310 may be a MDP model and the intersection-SSOCEM 4320 may be a POMDP model. The AVOMC 4100 may instantiate any number of instances of the SSOCEMs 4300 based on the operational environment data.

Instantiating a SSOCEM 4300 instance may include identifying a model from the SSOCEM 4300 and instantiating an instance of the identified model. For example, a SSOCEM 4300 may include a primary model and a secondary model for a respective distinct vehicle operational scenario and instantiating the SSOCEM 4300 may include identifying the primary model as a current model and instantiating an instance of the primary model. Instantiating a model may include determining whether a solution or policy is available for the model. Instantiating a model may include determining whether an available solution or policy for the model is partially solved or is convergent and solved. Instantiating a SSOCEM 4300 may include instantiating an instance of a solution or policy for the identified model for the SSOCEM 4300.

Solving a model, such as a POMDP model, may include determining a policy or solution, which may be a function, that maximizes an accrued reward, which may be determined by evaluating the possible combinations of the elements of the tuple, such as <S, A, $\Omega$, T, O, R>, that defines the model. A policy or solution may identify or output a reward maximized, or optimal, candidate vehicle control action based on identified belief state data, which may include a belief state b from a set of belief states B (b∈ B), which may be a probability distribution over the states (S).

The identified belief state data, which may be probabilistic, may indicate current state data, such as a current set of state values for the respective model, or a probability for the current set of state values, and may correspond with a respective relative temporal location. For example, solving a MDP model may include identifying a state from the set of states (S), identifying an action from the set of actions (A), determining a subsequent, or successor, state from the set of states (S) subsequent to simulating the action subject to the state transition probabilities. Each state may be associated with a corresponding utility value and solving the MDP model may include determining respective utility values corresponding to each possible combination of state, action, and subsequent state. The utility value of the subsequent state may be identified as the maximum identified utility value subject to a reward, or penalty, which may be a discounted reward, or penalty. The policy may indicate an action corresponding to the maximum utility value for a respective state. Solving a POMDP model may be similar to solving the MDP model, except based on belief states, representing probabilities for respective states and subject to observation probabilities corresponding generating observations for respective states. Thus, solving the SSOCEM model includes evaluating the possible state-action-state transitions and updating respective belief states, such as using Bayes rule, based on respective actions and observations.

In an example, an initial belief state ($b_0 \in B$) may be identified as the current belief state (b∈ B), an action (a∈ A) may be performed, an observation ($\omega \in \Omega$) may be observed, and the current belief state (b∈ B) may be updated to identify an updated current belief state (b'∈ B), which may be expressed, using a normalization constant $\eta = Pr(\omega|b, s)^{-1}$, as the following:

$$b'(s' \mid b, a, \omega) = \eta O(a, s', \omega) \sum_{s \in S} T(s, a, s') b(s). \quad \text{[Equation 1]}$$

At each increment, such as at each time step, an action (a∈ A) may be selected based on a current belief state (b∈ B). A policy $\pi$: B→A may represent a mapping of a belief state (b∈ B) to an action (a∈ A). A value function $V^\pi$: B→□ may represent and expected cumulative reward of each belief state (b∈ B). An optimal policy $\pi^*$ may maximize the expected cumulative reward, such that the actions according to the optimal policy maximize an expected future reward based on the current belief state (b∈ B). Other POMDP solution methods may be used.

Although not shown in FIG. 4, the autonomous vehicle may include an autonomous vehicle actuation control system, or multiple autonomous vehicle actuation control systems. The autonomous vehicle actuation control system may receive vehicle control actions, such as from the autonomous vehicle operational management system 4000, and may control one or more kinematic units of the autonomous vehicle, such as a steering actuator, an accelerator, a breaking system, or a combination thereof, to perform the vehicle control action. The autonomous vehicle actuation control system may include one or more actuation models, such as a POMDP or other automated control model, of vehicle response based on the identified vehicle control action and the operational environment of the autonomous vehicle, and may determine low-level vehicle actuation control parameters, such as amounts of force or degrees of steering, based on the actuation models.

Figure 5:
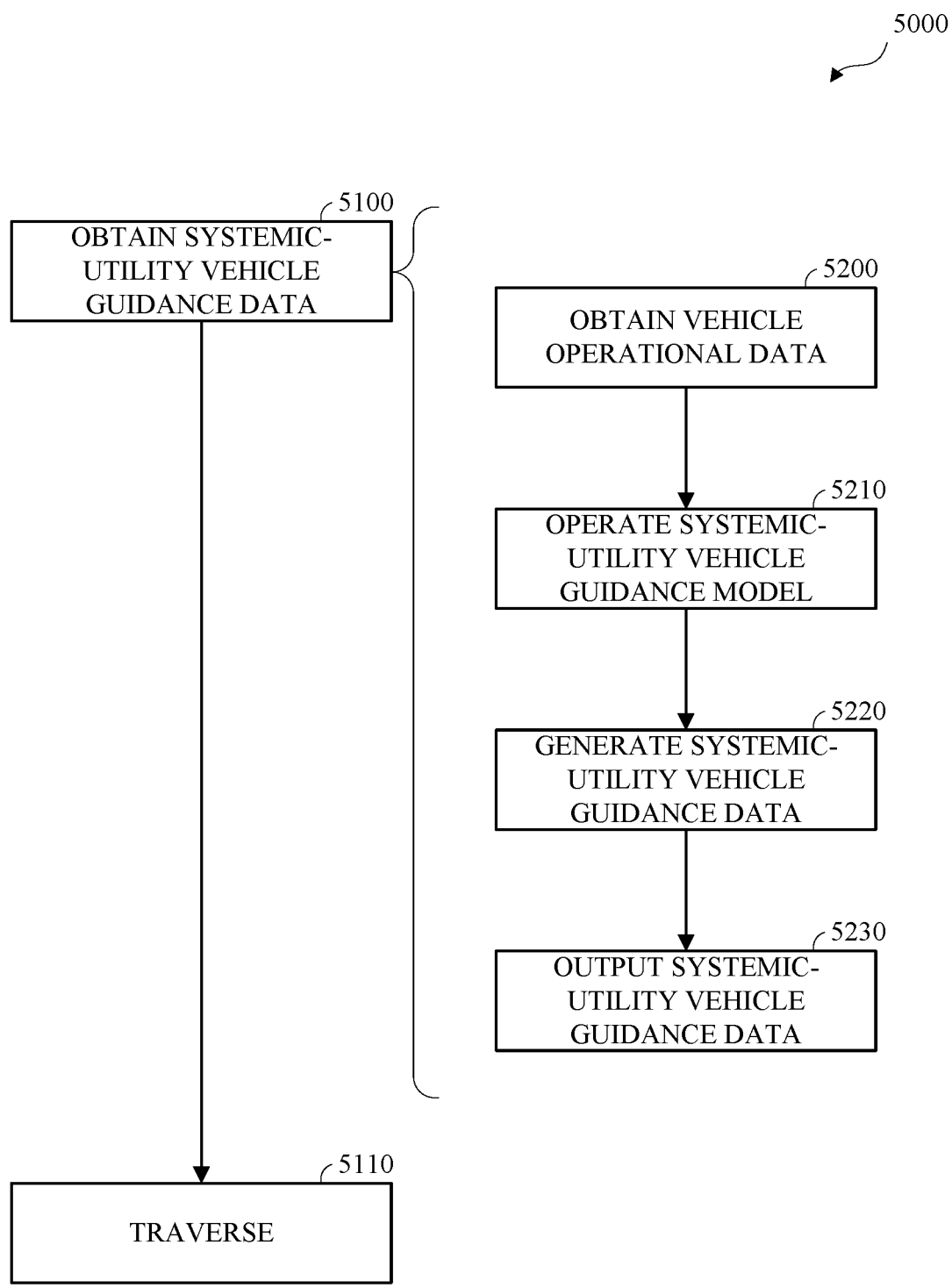
FIG. 5 is a flow diagram of an example of vehicle guidance with systemic optimization in accordance with embodiments of this disclosure.

FIG. 5 is a flow diagram of an example of vehicle guidance with systemic optimization 5000 in accordance with embodiments of this disclosure. Vehicle guidance with systemic optimization 5000 may be implemented, or partially implemented, in a vehicle, such as the vehicle 1000 shown in FIG. 1 or one of the vehicles 2100/2110 shown in FIG. 2. In some embodiments, the vehicle may be an autonomous vehicle, a semi-autonomous vehicle, or any other vehicle implementing autonomous driving. For example, an autonomous vehicle may implement an autonomous vehicle operational management system, such as the autonomous vehicle operational management system 4000 shown in FIG. 4. In some embodiments, the vehicle may omit implementing autonomous driving or may be in an operational mode wherein autonomous driving is omitted. Aspects of vehicle guidance with systemic optimization 5000 may be implemented in an infrastructure device, such as one or more of the communicating devices 2400/2410 shown in FIG. 2.

As shown in FIG. 5, vehicle guidance with systemic optimization 5000 includes obtaining systemic-utility vehicle guidance data at 5100 and traversing a portion of the vehicle transportation network in accordance with the systemic-utility vehicle guidance data at 5110.

Obtaining systemic-utility vehicle guidance data at 5100 includes obtaining vehicle operational data for the region at 5200, operating a systemic-utility vehicle guidance model for the region at 5210, generating the systemic-utility vehicle guidance data at 5220, and outputting the systemic-utility vehicle guidance data at 5230.

In some embodiments, a vehicle, such as a current vehicle, may implement, or solve, the systemic-utility vehicle guidance model, and obtaining the systemic-utility vehicle guidance data at 5100 may include obtaining vehicle operational data for the region by the current vehicle at 5200, operating the systemic-utility vehicle guidance model for the region by the current vehicle at 5210, generating the systemic-utility vehicle guidance data by the current vehicle at 5220, and outputting the systemic-utility vehicle guidance data by the current vehicle at 5230. Outputting the systemic-utility vehicle guidance data by the current vehicle at 5230 may include outputting the systemic-utility vehicle guidance data from a unit of the current vehicle implementing, or operating, the systemic-utility vehicle guidance model to another unit or component of the current vehicle. In some embodiments, outputting the systemic-utility vehicle guidance data by the current vehicle at 5230 may include outputting the systemic-utility vehicle guidance data by the current vehicle to one or more external devices, such as one or more remote vehicle, one or more infrastructure devices, or a combination thereof, such as via an electronic communication link, such as the one or more of the wireless communication links 2310/2320/2370/2380/2385 shown in FIG. 2.

In some embodiments, a remote vehicle, such as the remote vehicle 2110 shown in FIG. 2, may implement, or solve, the systemic-utility vehicle guidance model, and obtaining the systemic-utility vehicle guidance data at 5100 for the current vehicle may include obtaining the systemic-utility vehicle guidance data from the remote vehicle, such as via an electronic communication link, such as the one or more of the wireless communication links 2310/2320/2370/2380/2385 shown in FIG. 2. For example, the current vehicle may automatically receive, such as via a monitored communication port at the current vehicle, the systemic-utility vehicle guidance data from the remote vehicle or by sending a request for the systemic-utility vehicle guidance data from the current vehicle to the remote vehicle and receiving the systemic-utility vehicle guidance data by the current vehicle from the remote vehicle in response to the request. In embodiments in which obtaining the systemic-utility vehicle guidance data at 5100 for the current vehicle includes obtaining the systemic-utility vehicle guidance data from the remote vehicle, the remote vehicle may implement or perform obtaining vehicle operational data for the region at 5200, operating the systemic-utility vehicle guidance model for the region at 5210, generating the systemic-utility vehicle guidance data at 5220, and outputting the systemic-utility vehicle guidance data at 5230. Although not shown expressly in FIG. 5 one or more of obtaining vehicle operational data for the region at 5200, operating the systemic-utility vehicle guidance model for the region at 5210, generating the systemic-utility vehicle guidance data at 5220, and outputting the systemic-utility vehicle guidance data at 5230 may be performed by the remote vehicle in response to receiving a request for the systemic-utility vehicle guidance data, in response to a defined event, or periodically. Although not shown expressly in FIG. 5, the current vehicle may generate and send one or more requests for the systemic-utility vehicle guidance data in response to a defined event or periodically.

In some embodiments, an infrastructure device, such as one of the communication devices 2400/2410 shown in FIG. 2, which may be a centralized infrastructure device or a decentralized infrastructure device, may implement, or solve, the systemic-utility vehicle guidance model, and obtaining the systemic-utility vehicle guidance data at 5100 for the current vehicle may include obtaining the systemic-utility vehicle guidance data from the infrastructure device, such as via an electronic communication link, such as the one or more of the wireless communication links 2310/2320/2370/2380/2385 shown in FIG. 2. For example, the current vehicle may automatically receive, such as via a monitored communication port at the current vehicle, the systemic-utility vehicle guidance data from the infrastructure device or may send a request for the systemic-utility vehicle guidance data from the current vehicle to the infrastructure device and receive the systemic-utility vehicle guidance data by the current vehicle from the infrastructure device in response to the request. In embodiments in which obtaining the systemic-utility vehicle guidance data at 5100 for the current vehicle includes obtaining the systemic-utility vehicle guidance data from the infrastructure device, the infrastructure device, or a combination of infrastructure devices, may implement or perform obtaining vehicle operational data for the region at 5200, operating the systemic-utility vehicle guidance model for the region at 5210, generating the systemic-utility vehicle guidance data at 5220, and outputting the systemic-utility vehicle guidance data at 5230. Although not shown separately in FIG. 5 one or more of obtaining vehicle operational data for the region at 5200, operating the systemic-utility vehicle guidance model for the region at 5210, generating the systemic-utility vehicle guidance data at 5220, and outputting the systemic-utility vehicle guidance data at 5230 may be performed by the infrastructure device in response to receiving a request for the systemic-utility vehicle guidance data, in response to a defined event, or periodically. Although not shown expressly in FIG. 5, the current vehicle may generate and send one or more requests for the systemic-utility vehicle guidance data in response to a defined event or periodically.

In some embodiments, a centralized infrastructure device, such a server, for the region implements, such as solves, the systemic-utility vehicle guidance model for the region. A centralized infrastructure device may be physically located in the region, near the region, or at any distance from the region.

In some embodiments, a decentralized infrastructure device, such an edge server, for the region implements, such as solves, the systemic-utility vehicle guidance model for the region. A decentralized infrastructure device may be physically located in, or adjacent to, the region.

Obtaining vehicle operational data for the region at 5200 includes obtaining vehicle transportation network data representing the vehicle transportation network for the region. For example, the vehicle transportation network data may include stop-lines, traffic light (or metered) locations, toll booths, yields, forced merge locations, lane split locations, or any other data describing the region of the vehicle transportation network that may be represented in the vehicle transportation network data.

Obtaining vehicle operational data for the region at 5200 includes obtaining vehicle operational data (current operational data) for the vehicles operating in the region. The vehicle operational data for the region may include data reported by respective vehicles in the region. The vehicle operational data for the region may include data generated by one or more off-vehicle sensors, such as sensors of an infrastructure device, in the region. The vehicle operational data for a respective vehicle in the region may include location data, indicating a location of the vehicle in the vehicle transportation network, such as a road identifier, a road-segment identifier, a lane identifier, or any other data that indicates a location of the vehicle in the vehicle transportation network. The vehicle operational data for a respective vehicle may indicate a heading for the respective vehicle. The vehicle operational data for a respective vehicle may indicate velocity data for the respective vehicle. The vehicle operational data for a respective vehicle may indicate a current route, destination, or both, for the respective vehicle. The vehicle operational data for a respective vehicle may include non-operative data for the respective vehicle, such as vehicle type data, such as data indicating a car or truck type, or data indicating a make, a model, a model year, or any other data describing the respective vehicle. Participating vehicles may omit transmitting vehicle operational data other than vehicle operational data for which current valid opt-in data is identified. The vehicle operational data may be obtained using one or more sensors, such as infrastructure sensors, on-vehicle sensors, or a combination thereof. For example, infrastructure sensors may include pressure sensors, cameras, lidar sensors, radar sensors, or any other type of infrastructure sensor. The vehicles may report, such as send or otherwise make available, sensor data from on-vehicle sensors.

A participating vehicle, as described herein, is a vehicle, such as the current vehicle, that is identified as participating with respect to traversing at least a portion of the region of the vehicle transportation network in accordance with systemic-utility vehicle guidance data obtained from the systemic-utility vehicle guidance model for the region. For example, at a temporal location, the systemic-utility vehicle guidance data may indicate a defined target speed, a participating vehicle may be an autonomous vehicle, and the autonomous vehicle may traverse the region of the vehicle transportation network at, or reasonably near, the defined target speed, or the defined target speed may be displayed to a primary occupant, or driver, of the vehicle.

A non-participating vehicle is a vehicle identified as traversing at least a portion of the region of the vehicle transportation network in the absence of, without reference to, or inconsistently with, systemic-utility vehicle guidance data obtained from the systemic-utility vehicle guidance model for the region.

The systemic-utility vehicle guidance model for the region is operated at 5210. Operating the systemic-utility vehicle guidance model includes generating, or regenerating, the systemic-utility vehicle guidance model using vehicle operational data for the region. In some embodiments, generating the systemic-utility vehicle guidance model may include obtaining a previously generated systemic-utility vehicle guidance model and generating (regenerating) the systemic-utility vehicle guidance model based on the previously generated systemic-utility vehicle guidance model using vehicle operational data for the region. In some embodiments, the model may be generated, or regenerated, and solved based on vehicle or system operational data obtained prior to the current vehicle operations, such as prior observation data, prior action data, or a combination thereof, or aggregations thereof, such as statistical approximations of the state transition probabilities (T), the conditional observation probabilities (O), or both, and generating the policy may omit using the current vehicle operational data for the region obtained at 5200, or a portion thereof. In some embodiments, generating, or regenerating, the systemic-utility vehicle guidance model may include obtaining and using a previously generated systemic-utility vehicle guidance model for the region. In some embodiments, the model may be generated using vehicle operational data for the region obtained prior to obtaining the vehicle operational data for the region at 5200 and regenerated using vehicle operational data for the region obtained at 5200.

Operating the systemic-utility vehicle guidance model at 5210 includes solving, such as optimally solving, approximately solving, or partially solving, the systemic-utility vehicle guidance model to obtain a policy, such as a systemic-utility vehicle guidance policy, which may be expressed as pi(S)→A such that pi(S)=[$a_1$, $a_2$, . . . , $a_k$], wherein the vehicle operational data for the region indicates that the region includes (k) participating vehicles and ($a_i$) indicates an action identified for the i-th participating vehicle. In some embodiments, obtaining the systemic-utility vehicle guidance policy may include obtaining a previously generated systemic-utility vehicle guidance policy corresponding to the systemic-utility vehicle guidance model for the region operated at 5210.

The systemic-utility vehicle guidance model is a stochastic model of systemic operational aspects for a region of the vehicle transportation network. For example, the systemic-utility vehicle guidance model for a region of the vehicle transportation network may be a Markov decision process (MDP) model, a stochastic shortest path (SSP) model, a partially observable Markov decision process (POMDP) model, a Markov game (MG) model, a partially observable Markov game (POMG) model, or a decentralized partially observable Markov decision process (Dec-POMDP) model. Distinct regions may be associated with, or modeled by, respective systemic-utility vehicle guidance models. A region of the vehicle transportation network may be a lane, a road segment, a contiguous group of road segments, a road, or an intersection, or a defined geographic region, such as a block, a neighborhood, a district, a county, a municipality, a state, a country, or another defined geographic region. Regions may be defined ad-hoc, such as manually. In some embodiments, regions may be non-overlapping. In some embodiments, two or more regions may overlap. Respective systemic-utility vehicle guidance models for regions that overlap may be concurrently, or substantially concurrently, operated. In some embodiments, a participating vehicle operating in a portion of the vehicle transportation network corresponding to overlapping regions may identify, such as select, a communicating device, a region, or a corresponding systemic-utility vehicle guidance model, from candidates, such as the overlapping regions, such as based on location, route, or a combination thereof. In some embodiments, the overlapping regions, or the communicating devices associated therewith, may a region for a vehicle operating in an overlapping portion of the regions. In some embodiments, one or more overlapping regions may communicate to identify a model, a policy, or systemic-utility vehicle guidance data, from among region-specific candidates, such as in accordance with one or more region coordination rules.

In some embodiments, the systemic-utility vehicle guidance model may be implemented using an ad-hoc rule-based system, which may include, for example, a function, such as $f(n, c)=s$, that maps a cardinality, or count, of the set of vehicles (v) in the region and a cardinality, or count, of the set of participating vehicles (c), to a speed (s), which may be expressed in terms of travel distance, such as miles or kilometers, per unit time, such as per-hour.

In some embodiments, the model may be solved as a Markov game or similar game theoretic structure. This results in a correlated equilibrium, Nash equilibrium, or stationary Markov perfect equilibrium that ensures utility-maximizing actions even if others, such as non-participating vehicles, choose a different policy than the one computed from an equilibrium.

As defined by the systemic-utility vehicle guidance model, a state (s) from the set of states (S), may represent a distinct condition of respective defined aspects, such as vehicle operations, for the region. A respective set of states (S) is defined. Each state (state space), from a set of states (S) may include one or more defined state factors. For example, the systemic-utility vehicle guidance model may include a stochasticity state factor ($S=x_i S_i$) indicating, on a per-vehicle basis, location data in the region, such as a lane identifier in a road segment. The granularity, or specificity, of the stochasticity state factor may correspond to the granularity, or detail, of the available vehicle transportation network data. For example, the vehicle transportation network data may be relatively low-resolution data describing roads but omitting lane data, and the stochasticity state factor may correspondingly indicate road position and omit lane data; or the vehicle transportation network data may include relatively high-resolution data describing roads and lanes, and the stochasticity state factor may correspondingly indicate road position and lane position for the respective vehicle. The stochasticity state factor for a respective vehicle may include heading data. In some embodiments, the stochasticity state factor for a respective vehicle may indicate other data with respect to the vehicle, such as observed velocity, vehicle make, model, year, type, such as car or truck, or any other data describing the vehicle or the operation thereof.

The systemic-utility vehicle guidance model includes an action (a) from the set of actions (A) may indicate an available vehicle control action or routing guidance at each state in the set of states (S). Each action (action space), from a set of actions (A) may include one or more defined action factors. For example, the actions ($A=x_j A_j$) may be provided, such as transmitted, or otherwise made available to, respective participating vehicles (j) to indicate a target vehicle control action, a target speed, a target lane, or any other targetable aspect of vehicle operation. The actions may be indicated on a per-vehicle basis for participating vehicles. In some embodiments, the action space may include undeliverable target actions for non-participating vehicles.

A state transition probability from the set of state transition probabilities (T) may probabilistically represent the likelihood of a vehicle (i) progressing to a subsequent state in $S_i$, subsequent to a current state in $S_i$, which may be based on the density of vehicles in the region. The density of vehicles in the region may be a function of the number, or cardinality, of vehicles operating in the region and the size, such as in terms of traversable space, of the region. The state transition probability models how the state factors change based on the action factors (for one step). For example, the state $S_a$ and $S_b$ of two vehicles a and b may indicate that are such that $S_a$ is behind $S_b$ on the road, the action ($A_a$) for vehicle a may indicate a target speed of 65 mph, the action ($A_b$) for vehicle b may indicate a target speed of 45 mph, and the transition probability (T) would describe that $S_a$ cannot move past $S_b$. Thus, the state transition of state factors $S_a'$ and $S_b'$ at the subsequent time step, or temporal location, would reflect this enforcement. The state transition probabilities (T) may describe, or map, how vehicles, including participating and non-participating vehicles, may behave based on the systemic-utility vehicle guidance data for the participating vehicles. In some embodiments, the state transition probabilities (T) may be a matrix of probabilities. In some embodiments, the state transition probabilities (T) may be a generated model from Monte Carlo simulations.

The systemic-utility vehicle guidance model includes a reward function (R), which determines a respective positive or negative (cost) value that may be accrued for each combination of state and action. The rewards represent the time to progress along the lane. In some embodiments, the time to progress along the lane may indicate an average, such as a historical average, temporal span for a vehicle to traverse a road segment, or a defined sequence thereof. In some embodiments, the time to progress along the lane may indicate a traversal distance for a road segment, or a defined sequence thereof, divided by a corresponding speed limit, or average vehicle speed. The time to progress along the lane may be identified on a per-vehicle basis or may be an aggregated, such as average, value for the vehicles operating in the region.

For example, the systemic-utility vehicle guidance model may be an MDP model, and the reward may be a weighted sum of vehicles. In another example, the systemic-utility vehicle guidance model may be a MG, and the reward may be on a per-vehicle basis. The reward is a negative value corresponding to the time spent on the lane, which may be the lane length, such as in miles, divided by vehicle speed, such as in miles per hour, indicating the time to traverse lane, such as in hours.

The systemic-utility vehicle guidance data is generated by the systemic-utility vehicle guidance model at 5220. Generating the systemic-utility vehicle guidance data includes generating a respective message or signal for the respective participating vehicles in the region. Generating the message for a respective participating vehicle includes indicating, in the message, the action identified by the systemic-utility vehicle guidance model for the respective participating vehicle at 5210. Although described as an action, the indication of the action in the systemic-utility vehicle guidance data may be an indication of a control guidance action, which may be a proposed action or proposed target operating parameter, such as a target speed.

In an example, the region of the vehicle transportation network may be an intersection in the vehicle transportation network, which may be at a relatively low spatial scope relative to other regions described herein. For example, the region of the vehicle transportation network corresponding to an intersection in the vehicle transportation network may include a defined geospatial distance, such as less than or equal to one quarter of one kilometer around the intersection. The systemic-utility vehicle guidance model for the region (systemic-utility intersection guidance model) may optimize the throughput of vehicles traversing the intersection. Risk may be minimized (maximized safety). For example, a systemic-utility vehicle guidance policy for a systemic-utility intersection guidance model for a region of the vehicle transportation network corresponding to an intersection in the vehicle transportation network may obtain or generate systemic-utility vehicle guidance data indicating one or more vehicle control actions corresponding to right-of-way priority for the intersection, one or more vehicle control actions corresponding to a speed for a respective vehicle approaching or traversing the intersection, or both.

The operation of one or more participating vehicles traversing an intersection region in accordance with systemic-utility vehicle guidance data may improve the systemic-utility of vehicles operating in the intersection region over the absence of vehicles participating vehicles. For example, systemic-utility vehicle guidance model may be more complex than a vehicle-specific operational model, which may correspond with greater accuracy for the systemic-utility vehicle guidance model. Non-participating vehicles may operate a model, or may operate via manual control, that maximizes vehicle-specific operational utility, which may omit, such as due to unavailability, vehicle operational data, such as data indicating uncertainties in delays for one or more of the other vehicles operating in the region, which may correspond with lower systemic-utility relative to systemic-utility vehicle guidance models. In some embodiments, the state transition probabilities (T) of a systemic-utility vehicle guidance model may include representing, such as based on an aggregation, such as a statistical average, vehicle operations, as previous vehicle operations that diverge or differ from right-of-way priority, which may be omitted from, or unavailable to, a model that maximizes vehicle-specific operational utility.

The systemic-utility intersection guidance model may be implemented by the current vehicle, a remote vehicle, a decentralized infrastructure device located in or near the region, or a centralized infrastructure device.

The systemic-utility intersection guidance model may include per-vehicle state factors. For example, a per-vehicle lane state factor indicates a lane, road segment, or road corresponding to a location of the vehicle in the vehicle transportation network, which may be expressed in the systemic-utility intersection guidance model as ($s_i^\ell$). The lane state factor may indicate an identifier for the lane, road segment, or road, which may be unique within the region or the vehicle transportation network, or may have a semantic meaning, such as a name of the road, a lane number, and a distance from a defined point along the road.

Although described with respect to lane state data, in some implementations, the per-vehicle state factors may include other data. For example, the per-vehicle state factors may include temporal data, such as temporal data indicating a temporal span of a vehicle at a location. In some implementations, the per-vehicle state factors may include speed or velocity data. In some implementations, the per-vehicle state factors may include acceleration data, such as lateral acceleration, longitudinal acceleration, or both. In some implementations, the per-vehicle state factors may include relative aggregated control data. Relative aggregated control data may be obtained, for example, using a machine learning classifier and a defined set of previous vehicle control data for a respective vehicle. The defined set of previous vehicle control data may be, for example, vehicle control data for a defined temporal span, such as one minute, and may include data such as speed data, velocity data, acceleration data, or a combination thereof, which may include lateral and longitudinal data, for the vehicle. The relative aggregated control data may indicate a probabilistic classification or measure of the operation of the vehicle corresponding to the input vehicle control data, which may be relative to corresponding target control data.

The systemic-utility intersection guidance model may include one or more state factors that may be, in a respective model, included as an aggregated state factor or as a per-vehicle state factor. For example, an aggregated speed, or velocity, state factor, which may be expressed as $S^s$, may indicate an aggregated measure of the vehicle speeds in the region, such as an average, or median, speed of the vehicles in the region. In another example, a per-vehicle speed, or velocity, state factor, which may be expressed as $S_i^s$, may indicate a reported or observed speed of the respective vehicle. Increasing the spatial scope of the state factors, or other factors, of the systemic-utility vehicle guidance model, such as from aggregated factors to per-vehicle factors, may increase the accuracy, computational complexity, or both, of solving the systemic-utility vehicle guidance model. The uncertainty associated with reported vehicle operational data, such as speed data, may differ, such as may be less than, the uncertainty associated with observed vehicle operational data. As used herein the term 'reported' with reference to data indicates data that is identified by a subject of the data, such as a sensor of a vehicle identifying a speed of the vehicle. As used herein the term 'observed' with reference to data indicates data that is identified by a party other than the subject of the data, such as a sensor of a vehicle identifying a state of a traffic control device or a speed of another vehicle, or by a sensor of an infrastructure device identifying a speed of a vehicle.

The systemic-utility intersection guidance model may include a right-of-way priority state factor indicating the right-of-way priority for the vehicles in the region, which may be expressed as $S^o$. In some embodiments, the right-of-way priority may indicate a vehicle that has the current right-of-way priority. In some embodiments, the right-of-way priority may indicate a relative position or order of respective vehicles for right-of-way priority.

For the region of the vehicle transportation network that represents an intersection, the state factors of the systemic-utility intersection guidance model may include per-vehicle lane state factors, an aggregated speed factor, and an aggregated priority factor, which may be expressed as $S=x_i(s_i^\ell)\times S^s\times S^o$.

In another example, for the region of the vehicle transportation network that represents an intersection, the state factors of the systemic-utility intersection guidance model may include per-vehicle lane state factors, per-vehicle speed factors, and an aggregated priority factor, which may be expressed as $S=x_i(s_i^\ell\times S_i^s)\times S^o$.

The systemic-utility intersection guidance model may include per-vehicle control guidance actions, such as 'stop', 'advance', and 'proceed' vehicle control guidance actions.

The 'stop' control guidance action may indicate guidance to perform a 'stop' vehicle control action as described herein. For a manually controlled vehicle, the 'stop' control guidance action may be presented to an occupant, such as a driver of the vehicle. For an autonomous vehicle, or a vehicle performing autonomous driving, the autonomous vehicle may perform the 'stop' vehicle control action in response to receiving systemic-utility vehicle guidance data including the 'stop' control guidance action.

The 'advance' control guidance action may indicate guidance to perform an 'advance' vehicle control action as described herein. For a manually controlled vehicle, the 'advance' control guidance action may be presented to an occupant, such as a driver of the vehicle. For an autonomous vehicle, or a vehicle performing autonomous driving, the autonomous vehicle may perform the 'advance' vehicle control action in response to receiving systemic-utility vehicle guidance data including the 'advance' control guidance action.

The 'proceed' control guidance action may indicate guidance to perform a 'proceed' vehicle control action as described herein. For a manually controlled vehicle, the 'proceed' control guidance action may be presented to an occupant, such as a driver of the vehicle. For an autonomous vehicle, or a vehicle performing autonomous driving, the autonomous vehicle may perform the 'proceed' vehicle control action in response to receiving systemic-utility vehicle guidance data including the 'proceed' control guidance action.

The systemic-utility intersection guidance model may include a reward function (R), which may be a piecewise function. A vehicle (i) may have priority ($S_i^o$) and the reward is zero (0). A positive reward, such as one may be used. Otherwise, the reward is the per-vehicle observed speed ($S_i^s$), such that a vehicle traversing the intersection in violation of right-of-way priority is penalized proportional to the speed of the vehicle. A fixed negative reward, or cost, such as negative one may be used.

In an example, the region of the vehicle transportation network may include geographically related roads, or portions thereof, in the vehicle transportation network, which may be at a relatively high spatial scope relative to other regions described herein. The systemic-utility vehicle guidance model (systemic-utility routing guidance model) for the region may be implemented by a centralized infrastructure device.

The systemic-utility routing guidance model may include per-vehicle state factors. For example, a per-vehicle lane state factor indicates a lane, road segment, or road corresponding to a location of the vehicle in the vehicle transportation network, which may be expressed in the systemic-utility routing guidance model as ($s_i^\ell$). The lane state factor may indicate an identifier for the lane, road segment, or road, which may be unique within the region or the vehicle transportation network, or may have a semantic meaning, such as a name of the road, a lane number, and a distance from a defined point along the road.

The systemic-utility routing guidance model may include a per-vehicle density state factor that indicates a local density of vehicles in the operating environment of a respective current vehicle, such as within fifty meters of the current vehicle, which may be expressed as ($S_i^d$).

The systemic-utility routing guidance model may include a per-vehicle speed, or velocity, state factor, which may be expressed as ($S_i^s$), which indicates a reported or observed speed of the respective vehicle.

For the region of the vehicle transportation network represented by the systemic-utility routing guidance model, the state factors of the systemic-utility routing guidance model may include per-vehicle lane state factors, per-vehicle speed factors, and per-vehicle vehicle density factors, which may be expressed as $S = x_i (S_i^\ell \times S_i^s \times s_i^d)$.

The systemic-utility routing guidance model may include per-vehicle control guidance actions, which may indicate per-vehicle speed guidance actions ($A_i^s$), which may indicate a target speed for a respective vehicle. In some embodiments, the action space may include per-vehicle target lane guidance actions ($A_i^\ell$), which may indicate a target lane for a respective vehicle. In some embodiments, the action space may include per-vehicle target route guidance actions ($A_i^r$), which may indicate a target route for a respective vehicle. The target route may indicate a route from a location of the respective vehicle to a target destination of the respective vehicle as indicated in the vehicle operational data for the region obtained at 5200 for the respective vehicle.

The systemic-utility routing guidance model may include a reward function (R), which may reflect an average time to traverse for the vehicles in the region, which may be the negative of a sum of differences of the per-vehicle lane, or road, length and the per-vehicle observed speed, which may be expressed as sum(lane_length($s_i^\ell$)/S_observed_speed for i in 1:k), and which may be averaged by dividing by k, wherein k may, for example, indicate defined target average speed. In some embodiments, the reward function may be the maximal time to traverse among the vehicles operating in the region. In some embodiments, the reward function for two or more vehicles in a road segment or intersection concurrently may be negative one and may be zero for vehicles in road segments or intersections in the absence of other operating vehicles.

In an example, the region of the vehicle transportation network may be a road, or a contiguous sequence of road segments of a road, in the vehicle transportation network, which may be at an intermediate spatial scope relative to other regions described herein. The systemic-utility vehicle guidance model (systemic-utility flow guidance model) for the region (flow-guidance region) may be implemented by a decentralized infrastructure device or a centralized infrastructure device.

In a flow-guidance region wherein the set of vehicles operating in the region omits participating vehicles, vehicle control is based on vehicle-specific operational utility, either as understood by a human driver or as determined by an autonomous process for the vehicle. For example, vehicles operating in a low-vehicle density portion of the region may accelerate, or change lanes, to minimize inter-vehicle distance, such as to near or at a relative minimal safe operating distance, thereby maximizing vehicle density for those vehicles, or for the portion of the region corresponding to the vehicles, and correspondingly decreasing vehicle density for trailing vehicles, or for other portions of the region. For a vehicle, low-vehicle density may indicate that a relative distance between the vehicle and another vehicle immediately ahead of the vehicle in a current lane is greater than a minimal safe operating distance. Delay in responding to changes in the operational environment (response delay) may reduce operational utility as a function of vehicle density. As such, the operational utility for a current vehicle is, at least in part, inversely correlated to the density of vehicles operating in the operational environment of the current vehicle. Further, the cardinality, or count, of vehicles operating in portions of the region having relatively high vehicle density, and thus relatively low operational utility, is relatively high and the cardinality, or count, of vehicles operating in portions of the region having relatively low vehicle density is relatively low, corresponding to relatively high operational utility for the portion, such that the systemic, such as average, operational utility for the region is sub-optimal. Although the predicted per-vehicle operational utility is maximized, the operation of other vehicles, also maximizing respective per-vehicle operational utility, affects the operation of the current vehicle such that observed per-vehicle operational utility is reduced as reflected by the sub-optimal systemic utility. This example may be referred to as elastic congestion. Although described with reference to elastic congestion, other vehicle operations optimized for per-vehicle operational utility may correlate with sub-optimal systemic utility.

For example, multiple vehicles, which may be in a low-vehicle density portion of the region, may respectively operate, such as by accelerating, to minimize inter-vehicle distance to a minimal safe operating distance, thereby forming a high-density cluster of vehicles in a high-vehicle density portion of the region. A first vehicle in the high-density cluster may decelerate by breaking, the distance between the first vehicle and a second vehicle, immediately subsequent to the first vehicle in the direction of travel, may decrease, such as due to the response delay of the second vehicle. The decreased distance between the first vehicle and the second vehicle may be less than a minimal safe operating distance. Subject to the response delay, the second vehicle may decelerate. Due to the distance between the first vehicle and the second vehicle being less than a minimal safe operating distance, uncertainty, or other factors, the second vehicle may decelerate more rapidly than the first vehicle (response amplification). Other vehicles in the high-density cluster, further subsequent in the direction of travel, may have a similar response delay and a cascading increase in the rate of deceleration. The average, or other aggregate measure, speed of the vehicles in the high-density cluster may be reduced and the per-vehicle risk may be increased, such that the operational utility for the high-vehicle density portion is reduced.

In a flow-guidance region wherein the vehicles operating in the region include one or more participating vehicles, wherein the region may include non-participating vehicles, the participating vehicles may operate at speeds, or in lanes, identified in accordance with the systemic-utility vehicle guidance data, which may be identified to optimize systemic operational utility for the region. For example, the vehicles may receive, or otherwise access, the systemic-utility vehicle guidance data output at 5230, which may indicate a target speed that is less than or equal to the speed of a vehicle immediately ahead of the vehicle in a current lane. The target speed indicated by the systemic-utility vehicle guidance data may differ from a target speed identified based on per-vehicle operational utility. Operating participating vehicles in accordance with the systemic-utility vehicle guidance data may reduce the effect of elastic congestion and increase the systemic operational utility.

For example, multiple vehicles may be operating in a region of the vehicle transportation network. Some non-participating vehicles may operate to minimize inter-vehicle distances, subject to minimal safe operating distances, of those non-participating vehicles with respect to the preceding vehicles in the direction of travel. Participating vehicles, operating in accordance with systemic-utility vehicle guidance data, may operate to maintain or increase inter-vehicle distances with respect to the preceding vehicles in the direction of travel. Because the participating vehicles, operating in accordance with the systemic-utility vehicle guidance data, omit minimizing inter-vehicle distances, the number of vehicles that form a high-density cluster may be reduced. The inter-vehicle distance between a leading non-participating vehicle and a trailing participating vehicle may be relatively large. The leading non-participating vehicle may decelerate by breaking, the distance between the leading non-participating vehicle and the trailing participating vehicle may decrease, such as due to the response delay of trailing participating vehicle. Due to the relatively large inter-vehicle distance prior to the deceleration, the decreased inter-vehicle distance between the leading non-participating vehicle and the trailing participating vehicle may be greater than the minimal safe operating distance. Subject to the response delay, the second vehicle may decelerate. Due to the inter-vehicle distance between the leading non-participating vehicle and the trailing participating vehicle being greater than the minimal safe operating distance, the trailing participating vehicle may decelerate at a rate substantially similar to the deceleration rate of the leading non-participating vehicle. Response amplification may be reduced or avoided. The extent of any cascading response amplification may be reduced, per-vehicle risk may be maintained, and the reduction of the average, or other aggregate measure, speed of the vehicles may be minimized, such that the relative systemic operational utility for the region is maintained or increased.

The systemic-utility flow guidance model may include per-vehicle state factors. For example, a per-vehicle lane state factor indicates a lane, road segment, or road corresponding to a location of the vehicle in the vehicle transportation network, which may be expressed in the systemic-utility vehicle guidance model as $(s_i^\ell)$. The lane state factor may indicate an identifier for the lane, road segment, or road, which may be unique within the region or the vehicle transportation network, or may have a semantic meaning, such as a name of the road, a lane number, and a distance from a defined point along the road.

The systemic-utility flow guidance model may include one or more aggregated state factors for the region. For example, an aggregated vehicle density state factor indicates a density of vehicles in the region, which may be expressed as $(S^d)$. The density of vehicles in the region may be a function of the number, count, or cardinality, of vehicles operating in the region, including participating and non-participating vehicles, which may be expressed as an aggregated value, such as an average or median, of vehicles per unit distance, such as per-mile or per-kilometer, of roads, per square meter. In some embodiments, the aggregated vehicle density state factor may express an aggregated value, such as an average or median, of distance between vehicles.

The systemic-utility flow guidance model may include one or more state factors that may be, in a respective model, included as an aggregated state factor or as a per-vehicle state factor. For example, an aggregated speed, or velocity, state factor, which may be expressed as $(S^s)$, may indicate an aggregated measure of the vehicle speeds in the region, such as an average, or median, speed of the vehicles in the region. In another example, a per-vehicle speed, or velocity, state factor, which may be expressed as $(S^s)$, may indicate a reported or observed speed of the respective vehicle. Increasing the relative granularity or resolution of the state factors, or other factors, of a systemic-utility vehicle guidance model, such as from aggregated factors to per-vehicle factors, may increase the accuracy, computational complexity, or both, of solving the systemic-utility vehicle guidance model.

For the region of the vehicle transportation network represented by the systemic-utility flow guidance model, the state factors of the systemic-utility flow guidance model may include per-vehicle lane state factors, an aggregated observed speed factor, and an aggregated vehicle density factor, and may be expressed as $S=x_i(S_i^t) \times s^s \times s^d$.

The systemic-utility flow guidance model may include per-vehicle control guidance actions, which may indicate a target speed for the respective vehicle.

The systemic-utility flow guidance model may include a reward function (R), which may be the negative of a sum of differences of the observed speeds of vehicles and the target speed indicated by the actions, which may be expressed as sum(S_observed_speeds[i]−A_speed[i] for i in 1:k). The systemic-utility flow guidance model may optimize to minimize differences between target speeds and observed speeds.

The systemic-utility vehicle guidance data is output at 5230. The systemic-utility vehicle guidance data, or a respective portion thereof, may be transmitted, or otherwise made available, to the participating vehicles in the region. For example, an infrastructure device may transmit the systemic-utility vehicle guidance data to respective participating vehicles in the region using any communication link as described herein, including combinations of communication links or dedicated short-range communications. In some embodiments, such as embodiments wherein the current participating vehicle implements the systemic-utility vehicle guidance model, transmitting the systemic-utility vehicle guidance data to other participating vehicles may be omitted.

The systemic-utility vehicle guidance data output at 5230 for a respective participating vehicle may indicate the per-vehicle control guidance action generated at 5220 from the systemic-utility vehicle guidance model operated at 5210 responsive to the vehicle operational data for the region obtained at 5200. In some embodiments, the systemic-utility vehicle guidance data output at 5230 for a respective participating vehicle may indicate the systemic-utility vehicle guidance policy obtained at 5210, the vehicle operational data, or a portion thereof, for the region obtained at 5200, or a combination thereof.

A portion of the vehicle transportation network, in the region, is traversed in accordance with the systemic-utility vehicle guidance data at 5110. For example, a vehicle may obtain, such as receive or otherwise access, the systemic-utility vehicle guidance data output at 5230 and may traverse a portion of the vehicle transportation network in accordance with the systemic-utility vehicle guidance data at 5110.

In some embodiments, traversing the portion of the vehicle transportation network in accordance with the systemic-utility vehicle guidance data at 5110 includes outputting a representation of at least a portion of the systemic-utility vehicle guidance data for presentation to an occupant of the vehicle (current vehicle). For example, the systemic-utility vehicle guidance data may indicate a target speed and traversing the portion of the vehicle transportation network in accordance with the systemic-utility vehicle guidance data may include outputting a representation of the target speed for presentation to a driver of the vehicle by highlighting the target speed on a speedometer of the vehicle. Other representations, such as visual representations, audio representations, haptic representations, or combinations thereof, of the systemic-utility vehicle guidance data may be used.

In some embodiments, traversing the portion of the vehicle transportation network in accordance with the systemic-utility vehicle guidance data at 5110 includes autonomously controlling the vehicle (current vehicle) to perform autonomous driving in accordance with the systemic-utility vehicle guidance data, such as in response to receiving the systemic-utility vehicle guidance data. For example, the systemic-utility vehicle guidance data may indicate a target speed and the autonomous vehicle may accelerate, or decelerate, to traverse the portion of the vehicle transportation network at, or approximately at, the target speed.

In some embodiments, traversing the portion of the vehicle transportation network in accordance with the systemic-utility vehicle guidance data at 5110 includes outputting a representation of at least a portion of the systemic-utility vehicle guidance data for presentation to an occupant of the vehicle and autonomously controlling the vehicle to perform autonomous driving in accordance with the systemic-utility vehicle guidance data, such as in response to receiving the systemic-utility vehicle guidance data. For example, the systemic-utility vehicle guidance data may indicate a target speed and the autonomous vehicle may accelerate, or decelerate, to traverse the portion of the vehicle transportation network at, or approximately at, the target speed and may output a representation of the systemic-utility vehicle guidance data as an indication of a reason for or explanation for traversing the portion of the vehicle transportation network at the target speed.

In some embodiments, a participating vehicle may receive systemic-utility vehicle guidance data from two or more overlapping regions, and traversing the portion of the vehicle transportation network in accordance with the systemic-utility vehicle guidance data at 5110 includes, for the respective systemic-utility vehicle guidance data, outputting a representation of at least a portion of the systemic-utility vehicle guidance data for presentation to an occupant of the vehicle (current vehicle), wherein elected (or selected) systemic-utility vehicle guidance data may be identified in response to input, such as user input indicating the systemic-utility vehicle guidance data. In some embodiments, the vehicle may autonomously traverse a portion of the vehicle transportation network in accordance with the elected systemic-utility vehicle guidance data.

Although aspects of the state space, action space, transition probabilities, and reward function are described for the systemic-utility vehicle guidance models described herein, the systemic-utility vehicle guidance models may implement other aspects. For example, the state space of a model may include other state factors. In another example, a model may include other aspects, such as a set of observations ($\Omega$) and a set of conditional observation probabilities (O).

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
    traversing, by a current vehicle, a vehicle transportation network, wherein traversing the vehicle transportation network includes:
        obtaining, by the current vehicle, systemic-utility vehicle guidance data for a current portion of the vehicle transportation network, from an instance of a systemic-utility vehicle guidance policy generated by solving a systemic-utility vehicle guidance model that maximizes systemic utility for a region of the vehicle transportation network that includes the current portion; and
        traversing, by the current vehicle, the current portion of the vehicle transportation network in accordance with the systemic-utility vehicle guidance data.

2. The method of claim 1, wherein traversing the current portion of the vehicle transportation network in accordance with the systemic-utility vehicle guidance data includes:
    outputting a representation of the systemic-utility vehicle guidance data for presentation to an occupant of the current vehicle.

3. The method of claim 1, wherein traversing the current portion of the vehicle transportation network in accordance with the systemic-utility vehicle guidance data includes:
    controlling the current vehicle to perform autonomous driving in accordance with the systemic-utility vehicle guidance data.

4. The method of claim 1, wherein the systemic-utility vehicle guidance data indicates at least one of:
    a target speed for the current vehicle to traverse the current portion of the vehicle transportation network;
    a target lane for the current vehicle to traverse the current portion of the vehicle transportation network;
    a target route for the current vehicle to traverse the current portion of the vehicle transportation network from a current location of the current vehicle to a target destination; or
    a target right-of-way priority for the current vehicle to traverse an intersection in the vehicle transportation network wherein the current portion of the vehicle transportation network includes the intersection.

5. The method of claim 1, wherein obtaining the systemic-utility vehicle guidance data includes:
    obtaining, by the current vehicle, the systemic-utility vehicle guidance data from an external device.

6. The method of claim 5, wherein:
    the external device is a remote vehicle;
    the external device is a centralized infrastructure device; or
    the external device is a decentralized infrastructure device.

7. The method of claim 1, wherein obtaining the systemic-utility vehicle guidance data includes:
    the systemic-utility vehicle guidance model is a stochastic model.

8. The method of claim 7, wherein the stochastic model is:
    a Markov decision process model;
    a stochastic shortest path model;
    a partially observable Markov decision process model;
    a Markov game model;
    a partially observable Markov game model; or a decentralized partially observable Markov decision process model.

9. The method of claim 7, wherein obtaining the systemic-utility vehicle guidance data includes:
operating, by the current vehicle, the stochastic model.

10. A method comprising:
obtaining vehicle operational data for a defined region of a vehicle transportation network, wherein the vehicle operational data includes current operational data for a plurality of vehicles operating in the defined region;
operating a systemic-utility vehicle guidance model for the defined region that maximizes systemic utility for the defined region;
obtaining systemic-utility vehicle guidance data for the defined region from the systemic-utility vehicle guidance model in response to the vehicle operational data; and
outputting the systemic-utility vehicle guidance data to at least one of the plurality of vehicles for controlling a vehicle from the at least one of the plurality of vehicles to traverse a portion of the vehicle transportation network.

11. The method of claim 10, wherein obtaining systemic-utility vehicle guidance data for the defined region includes obtaining per-vehicle systemic-utility vehicle guidance data for participating vehicles in the defined region.

12. The method of claim 10, wherein obtaining systemic-utility vehicle guidance data includes obtaining the systemic-utility vehicle guidance data such that the systemic-utility vehicle guidance data includes at least one of:
a target speed for the vehicle to traverse the portion of the vehicle transportation network;
a target lane for the vehicle to traverse the portion of the vehicle transportation network;
a target route for the vehicle to traverse the portion of the vehicle transportation network from a current location of the vehicle to a target destination of the vehicle; or
a target right-of-way priority for the vehicle to traverse an intersection in the vehicle transportation network wherein the portion of the vehicle transportation network includes the intersection.

13. The method of claim 10, wherein operating the systemic-utility vehicle guidance model is performed by:
a vehicle;
a centralized infrastructure device; or
a decentralized infrastructure device.

14. The method of claim 10, wherein the systemic-utility vehicle guidance model is:
a Markov decision process model;
a stochastic shortest path model;
a partially observable Markov decision process model;
a Markov game model;
a partially observable Markov game model; or
a decentralized partially observable Markov decision process model.

15. The method of claim 10, wherein operating the systemic-utility vehicle guidance model includes:
generating the systemic-utility vehicle guidance model using the vehicle operational data; and
solving the systemic-utility vehicle guidance model to obtain a systemic-utility vehicle guidance policy.

16. The method of claim 15, wherein obtaining the systemic-utility vehicle guidance data includes:
generating the systemic-utility vehicle guidance data using the systemic-utility vehicle guidance policy.

17. A method for use in traversing a vehicle transportation network, the method comprising:
traversing, by a current vehicle, a vehicle transportation network, wherein traversing the vehicle transportation network includes:
obtaining, by the current vehicle, systemic-utility vehicle guidance data for a current portion of the vehicle transportation network, wherein obtaining the systemic-utility vehicle guidance data includes:
obtaining vehicle operational data for a defined region of a vehicle transportation network, wherein the vehicle operational data includes current operational data for a plurality of vehicles operating in the defined region;
operating a systemic-utility vehicle guidance model for the defined region that maximizes systemic utility for the defined region in response to the vehicle operational data; and
obtaining the systemic-utility vehicle guidance data for the defined region from a policy generated by the systemic-utility vehicle guidance model; and
traversing, by the current vehicle, the current portion of the vehicle transportation network in accordance with the systemic-utility vehicle guidance data.

18. The method of claim 17, wherein traversing the current portion of the vehicle transportation network in accordance with the systemic-utility vehicle guidance data includes:
outputting a representation of the systemic-utility vehicle guidance data for presentation to an occupant of the current vehicle.

19. The method of claim 17, wherein traversing the current portion of the vehicle transportation network in accordance with the systemic-utility vehicle guidance data includes:
controlling the current vehicle to perform autonomous driving in accordance with the systemic-utility vehicle guidance data.

20. The method of claim 17, wherein the systemic-utility vehicle guidance data indicates at least one of:
a target speed for the current vehicle to traverse the current portion of the vehicle transportation network;
a target lane for the current vehicle to traverse the current portion of the vehicle transportation network;
a target route for the current vehicle to traverse the current portion of the vehicle transportation network from a current location of the current vehicle to a target destination; or
a target right-of-way priority for the current vehicle to traverse an intersection in the vehicle transportation network wherein the current portion of the vehicle transportation network includes the intersection.

* * * * *